(12) United States Patent
Schaffer et al.

(10) Patent No.: US 9,341,833 B2
(45) Date of Patent: May 17, 2016

(54) DEVICE FOR INCREASING THE DEPTH DISCRIMINATION OF OPTICAL IMAGING SYSTEMS

(75) Inventors: Joerg Schaffer, Goettingen (DE); Tim Plohnke, Goettingen (DE)

(73) Assignee: Carl Zeiss Microscopy GmbH, Jena (DE)

( * ) Notice: Subject to any disclaimer, the term of this patent is extended or adjusted under 35 U.S.C. 154(b) by 228 days.

(21) Appl. No.: 13/991,123

(22) PCT Filed: Sep. 13, 2011

(86) PCT No.: PCT/EP2011/065808
§ 371 (c)(1),
(2), (4) Date: May 31, 2013

(87) PCT Pub. No.: WO2012/072290
PCT Pub. Date: Jun. 7, 2012

(65) Prior Publication Data
US 2013/0250407 A1 Sep. 26, 2013

(30) Foreign Application Priority Data
Dec. 2, 2010 (DE) .......................... 10 2010 062 341

(51) Int. Cl.
*G02B 21/06* (2006.01)
*G02B 21/00* (2006.01)
(52) U.S. Cl.
CPC .............. *G02B 21/06* (2013.01); *G02B 21/004* (2013.01); *G02B 21/0032* (2013.01); *G02B 21/0076* (2013.01)
(58) Field of Classification Search
CPC ............................ G02B 21/16; G02B 21/0076

USPC .......................................... 359/385–390, 363
See application file for complete search history.

(56) References Cited

U.S. PATENT DOCUMENTS

| 5,896,224 | A | 4/1999 | Kapitza |
| 6,924,893 | B2 * | 8/2005 | Oldenbourg et al. ......... 356/369 |
| 7,298,551 | B2 * | 11/2007 | Wolleschensky ............. 359/386 |
| 2003/0086067 | A1 * | 5/2003 | Gerstner et al. ................ 353/30 |

FOREIGN PATENT DOCUMENTS

| DE | 102 50 568 A1 | 5/2004 |
| DE | 103 52 040 A1 | 7/2005 |
| DE | 10 2005 023 850 A1 | 11/2006 |

(Continued)

OTHER PUBLICATIONS

International Preliminary Report on Patentability for International Application No. PCT/EP2011/065808, dated Jun. 4, 2013.

*Primary Examiner* — Bumsuk Won
*Assistant Examiner* — Tamara Y Washington
(74) *Attorney, Agent, or Firm* — Patterson Thuente Pedersen, P.A.

(57) ABSTRACT

A device for increasing the depth discrimination of optical imaging systems includes elements for structuring illumination light in an illumination beam of the optical imaging system by application of a grating-like pattern in a conjugate object plane of the optical imaging system. The device further elements for varying the position of the grating-like patterns along an optical axis of the illuminating beam, and elements that vary the position of an image of the grating-like pattern on a specimen in an object plane. The invention may include a grating changer connected to an electronic control system or to a control program of the optical imaging system for automatically changing the grating-like pattern to at least one further grating-like pattern and/or for removing the grating like pattern from the illuminating beam path.

13 Claims, 2 Drawing Sheets

(56) References Cited

FOREIGN PATENT DOCUMENTS

| | | |
|---|---|---|
| DE | 698 38 297 T2 | 5/2008 |
| DE | 10 2007 007 395 A1 | 8/2008 |
| EP | 1 182 486 A1 | 2/2002 |
| EP | 1 307 774 B1 | 1/2008 |

* cited by examiner

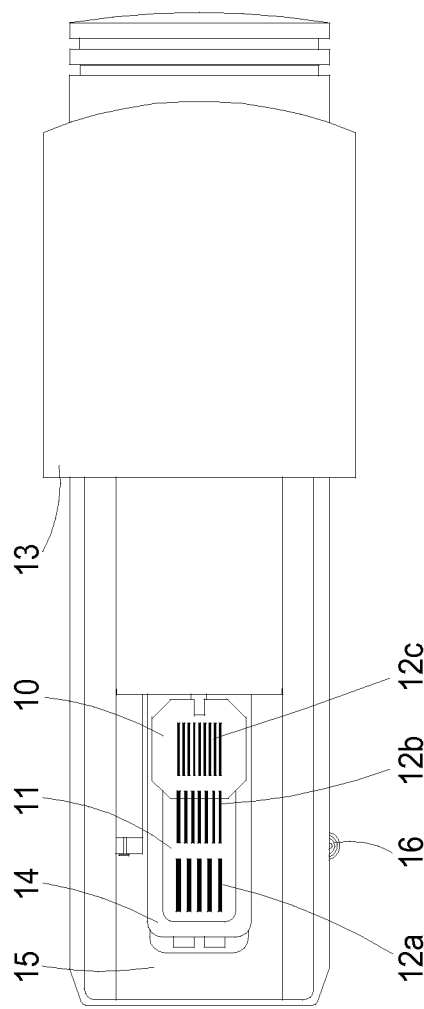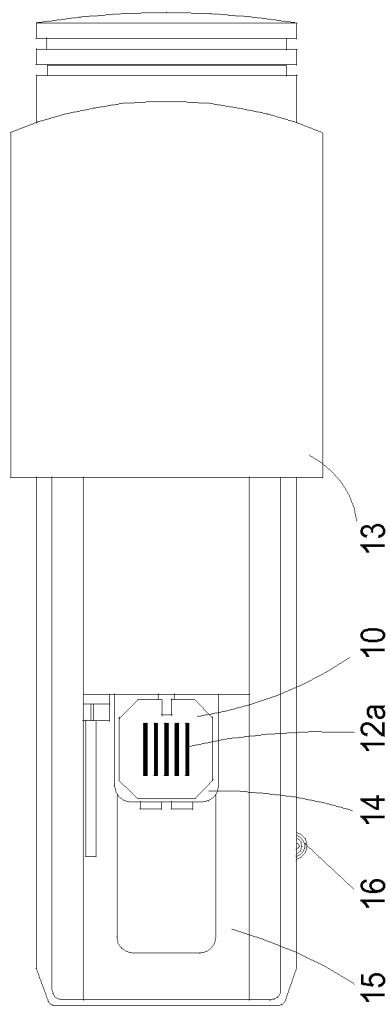

DEVICE FOR INCREASING THE DEPTH DISCRIMINATION OF OPTICAL IMAGING SYSTEMS

PRIORITY CLAIM

The present application is a National Phase entry of PCT Application No. PCT/EP2011/065808, filed Sep. 13, 2011, which claims priority from DE Application No. 10 2010 062 341.5 filed Dec. 2, 2010, said applications being hereby incorporated by reference herein in their entirety.

FIELD OF THE INVENTION

The invention relates to a device for increasing the depth discrimination of optical imaging systems. Such a device comprises, among other items, means for structuring illumination light in an illumination beam of the optical imaging system by means of a grating-like pattern provided in a conjugated object plane of the optical imaging system. The grating-like pattern may, for example, be a line grating pattern in the form of a unidimensional transmission grating, i.e., essentially an arrangement of stripes of a specified width and a with a specified spacing from each other, e.g. on a transparent substrate. Two-dimensional grating-like patterns can be used as well, such as, for example, checkered patterns. Instead of transmission gratings it is also possible to use phase gratings. Via the beam path of the device and the optical imaging system, the grating-like pattern is imaged onto a specimen, i.e., an object to be examined by means of the optical imaging system. The beam path is conceived in such a way that the grating-like pattern is imaged from a conjugated object plane into the object plane of the optical system. In a specimen that spatially extends mainly along the optical axis—also known as Z axis—and is thus perpendicular to the plane of observation, the structured illumination is then perceived as a pattern of dark stripes in the specimen region lying in the object plane or, in other words, in the focal plane, i.e. the plane in which the three-dimensional specimen is imaged in sharp focus. In specimen regions lying before or behind this focal plane, the structured illumination loses in distinctness as the distance from the focal plane increases, so that the specimen can be analyzed more precisely with regard to its extension in the Z direction.

Such a device further comprises means for the lateral variation of the position of the image of the grating-like pattern on the specimen in the object plane. In this way, the spatial phase of the grating-like pattern can be varied, as a rule by means of an electronic control system. With an electronic camera and image interpretation connected, it is possible, by means of spatial-phase-dependent detection and computation of the structured image records, to compute an image of an accurate optical section.

The device is further provided with means for varying the position of the grating-like pattern along the optical axis of the illuminating beam. In this way it is also possible to correct the optical imaging system's chromatic longitudinal aberration, which causes the focal planes for different wavelengths to occupy different places on the optical axis. A variation is of advantage, e.g., if the specimen is to be excited to fluoresce using light of different wavelengths.

BACKGROUND OF THE INVENTION

A device for increasing the depth discrimination is described, e.g., in the German patent application (unexamined first publication) DE 102 50 568 A1 and in the European patent application EP 1 307 774 B1. The present application expressly refers to these two documents. The arrangements and methods described in them are specially suited for use in microscopy, above all in the field of fluorescence microscopy.

For varying the lateral position of the image of the grating-like pattern in the specimen's focal plane, DE 102 50 568 A1 provides for a plane-parallel glass plate, which can be tilted by defined amounts so that the image of the line grating pattern on the specimen shifts within the specimen's focal plane. This can be done, e.g., by means of a galvanic scanner driven via an electronic control system, which controls both the device for increasing the depth discrimination and the optical imaging system. For moving the pattern axially, EP 1 307 774 B1 suggests a motor-driven eccentric motion.

Such devices are implemented, e.g., in the "ApoTome", a product of Carl Zeiss Microscopy GmbH offered as an optional slide-in module for a number of the company's microscopes.

The use of various objectives—which is readily possible, as a rule, in microscopes with revolving nosepieces, which can accommodate three different objectives, for example— requires that a user has to be furnished with a variety of line grating patterns. A set of grating-like patterns provided will contain one pattern that matches the magnification and numerical aperture of the objective and is best suited to the specific application of generating optical sections. Ideally, this pattern supplies a slice thickness that approximately corresponds to the depth of focus.

In case of a change of objectives, the electronic control system, as a rule, recommends the user which grating-like pattern matches the substituted objective best, this recommendation being the result of computation based on the objective data (in particular, magnification and numerical aperture), or of consulting a look-up table. Selection of the grating-like pattern is made on the basis of the magnification and the numerical aperture of the objective, also taking into account the wavelength of the illuminating light where appropriate. The specifications of the grating-like pattern selected from the set of grating-like patterns by the electronic control system are then displayed to the user on an output unit, e.g., in a dialog box on a monitor. The user should then change the grating-like pattern, but he may also ignore the recommendation.

For changing the grating-like pattern, the user needs to remove the module from the beam path and, subsequently, the line grating from the device before inserting and fixing the other line grating into a suitable holder. As the substrates with the grating-like patterns are rather small, it is necessary, as a rule, to use auxiliary devices for these operations, such as tweezers or similar gripping tools. Thereafter, the module can be reinserted into the microscope.

This time-consuming effort may be just acceptable if objectives have to be changed only occasionally. Where microscopes are provided with objective-changing devices such as, e.g., triple or quintuple revolving nosepieces, which virtually invite a user to frequently alternate between different magnifications, the time and effort involved in changing the grating for structured illumination is disproportionate and all but offsets the advantages offered by the objective changer.

SUMMARY OF THE INVENTION

The problem of the invention is to overcome this disadvantage and improve the above-described device to the effect that the time and effort to be spent by the user in changing the grating-like pattern is reduced compared to prior art.

In a device of the type described above, is problem is solved in such a way that it is provided with a grating changer for automatically changing from one grating-like pattern to at least one more grating-like pattern and/or for automatically removing the grating-like pattern from the illuminating beam path, this grating changer being connected with an electronic control system of the optical imaging system. In a fully automatic mode of operation, the use of such a grating changer makes manual interference by the user superfluous, since in the event of a change of objectives the grating changer is actuated by an electronic control system in such a way as to put into the illuminating beam path the grating-like pattern that matches the newly-selected objective best. The grating-like pattern previously in the illuminating beam path is removed therefrom, either simultaneously or beforehand. When a rest position is set, e.g., when the device, configured as a module, is pulled out halfway of the instrument using the device until a click-in position is reached, the grating changer removes the grating-like pattern currently in the illuminating beam path from the same without putting another grating-like pattern into it. The same happens when the device is completely removed from the optical imaging system. When the device is reinserted or when a working position is set again on the device, the grating changer replaces the grating-like pattern into the beam path that was there previously, i.e., unless the objective has been changed, in which case a new, better-matched grating-like pattern can be selected and put into the beam path. The device may also be operated in a semi-automatic mode, which means that the change is executed only if the user confirms it in the dialog box. Also, the user may select a grating-like pattern via the dialog box and have it put into the beam path.

The automatic grating changer can be implemented in various ways.

In a first embodiment, the grating changer comprises a transparent substrate which is, by means of a motor, movable relative to the optical axis of the illumination beam path and on which several grating-like patterns differing from each other are applied. The motor-driven movement may take place, e.g., normal to the optical axis; placement and changing may, however, take place at an oblique angle relative to the optical axis or along a curved path. For an objective changer with three objectives, it suggests itself to use a substrate on which three different grating-like patterns are applied. At any time, one of the patterns, which matches the objective selected, is active and located in the illuminating beam path. If the objective is changed, a feedback signal is fed to the electronic control system, which then triggers the grating changer and moves the substrate by means of the motor until the grating-like pattern matching the newly-selected objective has reached the illuminating beam path. Alternatively or in addition, a control program may be used that is installed, e.g., on a PC connected to the device and which balances the status of the revolving nosepiece with that of the grating changer and then initiated a change of the grating-like pattern if necessary.

When the device, which is preferably configured as a module, is brought from the working position to a rest position, the substrate with the grating-like patterns is moved by the motor to such a position that the beam path is free and no grating-like pattern is projected into the object, i.e., the specimen. The rest position can be chosen so that the device needs to be moved a short distance only, so that in case the grating-like pattern were not removed from the beam path it would have remained visible.

Various configurations of the motor-driven movement of the substrate are possible. For example, the substrate can be shifted, in which case the grating-like patterns can be arranged on the substrate one behind the other. It is also feasible to apply the on a circular substrate. They can then be switched into the illuminating beam path by rotating the substrate, whose axis of symmetry is parallel to the optical axis. This alternative requires some more space, but less mechanical design effort.

If an objective is changed on the revolving nosepiece, the user can, as an advantage, select one of a set of substrates that contains grating-like patterns matching the current combination of objectives.

In another configuration of the grating changer, use is made of several substrates, each of which contains one grating-like pattern, instead of using one substrate containing all grating-like patterns. These substrates can be placed into the illuminating beam path in turn by means of a motor. Here again, different mechanisms are feasible. If the space available is restricted, one can, e.g. with an objective changer fitted with three objectives, use a slider containing three different substrates. Another version feasible is the use of three motor-driven sliders, which requires more space, though.

To completely avoid changing the grating-like patterns in case an objective is removed from the revolving nosepiece and replaced with another, it is also possible to use a combination of a slider and a magazine, which can, e.g., be attached to, and detached from the device. The magazine can be designed, e.g., like a drum, where the various substrates with the grating-like patterns are arranged radially about the central axis of the drum, with the drum being rotatable. In the event of a change of objectives, the slider can then place the substrate to an empty position in the drum and, after the drum has rotated, take up the respective new substrate, a procedure that requires the positions in the drum or the substrates to be labeled accordingly.

Other ways of putting grating-like patterns into the illuminating beam path by motor-driven sliding or rotation, or a combination of both, are possible as well. For example, the various substrates may be arranged on a wheel which has an axis of rotation that is parallel to the optical axis of the illuminating beam. Depending on which objective is selected by turning the revolving nosepiece, the wheel is turned about the axis of rotation, either clockwise or anticlockwise, until the substrate with the appropriate grating-like pattern is in the beam path. This configuration requires more space than a solution based on sliders only, but it is less prone to mechanical faults and suitable especially for a small number of substrates.

Even if a drum or a wheel is used, it is possible to combine it with the arrangement of several grating-like patterns on a substrate as described above, if sufficient space is available. In case of the wheel, either the entire wheel can be shifted normal to the optical axis, or else the substrate is held in a holder and, for getting it into the beam path, is removed from the holder by means of a suitable gripper and/or slider after the wheel has been rotated to the appropriate position.

Another embodiment of the invention does largely without mechanical means for changing the grating-like patterns. In this case the grating changer comprises a unit for spatial light modulation for the purpose of generating different grating-like patterns. These are generated in a conjugated object plane. This unit for spatial light modulation (Spatial Light Modulator, SLM) is controlled electronically so that it generates the appropriate grating-like patterns depending on the objective currently in the beam path. In the event of a change of objectives, the electronic control varies the behavior of the spatial light modulator in such a way that the grating-like pattern matching this objective is generated; if the device is removed or if the rest position is set, the light modulator is switched to transmit the light completely without structuring it.

It is useful if the grating changer is coupled with an objective changer of the optical imaging system via the electronic control system, with the electronic control system being designed in such a way that the grating-like pattern to be put into the beam path is selected as a function of the magnification and/or numerical aperture of the selected objective. In this way it is ensured that the grating-like pattern put into the illuminating beam path is always the one that optimally matches the respective objective.

It is expedient if the means for varying the position of the image also comprise a plane-parallel glass plate arranged downstream of the grating-like pattern in the illuminating beam path. Preferably, this glass plate is tiltable relative to the optical axis of the illuminating beam by means of a galvanic scanner controlled by the electronic control system, the tilting being effected about an axis that is parallel to the lines of the grating-like pattern and ideally intersects the optical axis. Thanks to the use of a galvanic scanner, the tilt can be varied very quickly, so that the images needed for generating section images—as a rule, at least three at different tilt angles of the glass plate—can be recorded without much delay, possibly in combination with fast scanning in Z direction, i.e. along the optical axis.

It is further expedient if the means for varying the position of the grating-like pattern comprise a motor that is provided with an eccentric cam and controlled by means of an electronic control system. This permits shifting along the optical axis to compensate chromatic longitudinal aberrations, which may occur if different wavelengths are used for the illuminating light. This is frequently the case, e.g., in fluorescence analyses.

The device described above can be used to advantage especially in the form of a module in an optical imaging system, e.g., in a microscope, especially in a microscope provided with a revolving nosepiece. Here, there is no need for time-consuming manual exchange of the grating-like patterns. In addition, it may be arranged that, when one sets a rest position on the device, the grating changer removes from illuminating beam path the grating-like pattern currently present in it. The same can take place if the device as a whole is removed from the optical imaging system. This provides better protection of the grating-like patterns or the substrates, respectively.

Vice versa, it is possible that, when a working position is set on the device or when the device is inserted into the optical imaging system, the grating changer puts the grating-like pattern previously in the illuminating beam path back into the same. If the objective has been changed in the meantime, the corresponding grating-like pattern is put into the beam path instead.

Moreover, it is obviously also possible, as indicated above, to replace or supplement the substrates, or the wheels with the substrates, or individual elements of the drum, or the entire drum, if the configuration of the objectives fitted to the objective changer is changed, i.e. if an objective is removed and replaced with another one that differs in magnification and numerical aperture.

It is understood that the features mentioned before and those to be explained below are applicable not only in the combinations stated but also in other combinations or as stand-alone features, without leaving the scope of the present invention.

BRIEF DESCRIPTION OF THE DRAWINGS

Below, the invention will be explained in more detail and exemplified with reference to the accompanying drawings, which also show features essential to the invention, among others, and in which FIG. 3a shows a grating changer in which one of the three grating-like patterns shown in FIG. 2 is arranged in the illuminating beam path, and FIG. 3b shows a grating changer in which a different one of the grating-like patterns shown in FIG. 2 is in the illuminating beam path.

DETAILED DESCRIPTION OF THE DRAWINGS

Figure 1:
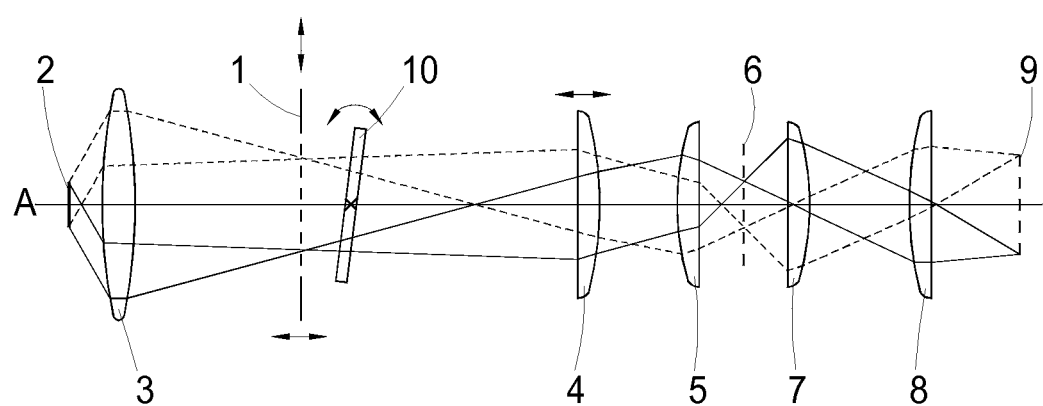
FIG. 1 shows the basic design of an illuminating beam for structured illumination.

FIG. 1 shows the fundamental design of a device for increasing the depth discrimination of optical imaging systems, as it can be used in form of a module supplementing an optical imaging system, which may, e.g., be a microscope, such as a transmitted-light or reflected-light microscope.

The device is provided with means for structuring illumination light in an illumination beam of the optical imaging system, which is shown in FIG. 1 as an overall view. In the example shown in FIG. 1, the said means for structuring the illuminating light comprise a grating-like pattern designed as a unidimensional transmission grating 1, which is arranged in a conjugated object plane of the optical imaging system. The device also comprises means for varying the position of the grating-like pattern along an optical axis A of the illuminating beam; the possible positioning movement indicated by the double-headed arrow drawn parallel to the optical axis. The axial variation of the position of the transmission grating 1 can be effected, e.g., by means of a motor-driven eccentric cam; for this purpose, the means for varying the position comprise a motor that is provided with an eccentric cam and controlled by means of an electronic control system. In this way it is possible to correct the error resulting from the chromatic longitudinal aberration of the lens combinations and causing the focal planes for different wavelengths auf the optical axis A to have different locations.

An effect equivalent to the shifting of the transmission grating 1 is the shifting of a tube lens 4, which is already part of the optical imaging system. This shifting possibility is also indicated by a double-headed arrow in FIG. 1. The term "lens" is understood to comprise also more complex lens systems or cemented components that create the effect needed.

The light of a source of illumination 2 passes a collector lens 3 and the transmission grating 1 and is imaged via the tube lens 4 and an objective or a condenser 5 onto an object plane 6, which ideally intersects a specimen not shown here. Via another objective 7 and a tube lens 8 arranged behind it, the line grating pattern of the transmission grating 1 is finally imaged onto an image focal plane 9, in which may be arranged, e.g., the detection chip of a camera, a common CCD or CMOS chip, or further means for imaging onto such a sensor. The intensities detected are fed to a data analysis unit.

Further, the device is provided with means for varying the lateral position of the image of the line grating pattern of the transmission grating 1 on the specimen in the object plane 6. For this purpose, a plane-parallel glass plate 10 is arranged behind the transmission grating 1 (in the direction of illumination) in the illuminating beam path. By motor action, e.g., by means of a galvanic scanner controlled by the electronic control system, this glass plate can be tilted relative to the optical axis A of the illuminating beam path and about an axis parallel to the lines of the grating pattern of the transmission grating 1. This axis is marked in FIG. 1 by the cross on the optical axis A in the glass plate 10; it is normal to both the optical axis A and to the sheet plane. Tilting the glass plate will cause a parallel shift of the rays of the illuminating light, which results in a variation of the spatial phase of the pattern in the specimen's focal plane, i.e., the object plane 6. By means of spatial-phase-dependent detection and the minimization of chromatic longitudinal aberrations described above, it becomes possible to generate structured images for computing an optical sectional image under different chromatic conditions. The result can be displayed as an image on a monitor not shown here, or saved for further use.

The device for increasing depth discrimination is further provided with a grating changer for semi- or fully-automatic changing of the grating-like pattern against at least one more grating-like pattern and/or for removing the grating-like pattern from the illuminating beam path; this grating changer is connected to the electronic control system of the optical imaging system. The grating changer is indicated by the double-headed arrow normal to the optical axis A, shown next to the transmission grating 1. It is possible for a user to select which other grating-like pattern is to be substituted; preferably, however, the grating changer is coupled, via the electronic control system, with an objective changer of the optical imaging system, and the electronic control system is designed in such a ways that the grating-like pattern to be put into the beam path is selected as a function of the magnification and/or numerical aperture of the selected objective placed into the beam path next as the revolving nosepiece is turned. This can be a fully automatic process, but alternatively the electronic control system may be designed to require the user's confirmation first. In neither case are any further manipulations needed for changing the grating-like pattern. Alternatively or in addition, a control program installed on a PC connected to the system may be used which compares the status of the revolving nosepiece with that of the grating changer and then initiates a change of the grating-like pattern if necessary.

Instead of being exchanged, the grating-like pattern can also be removed from the illuminating beam path without substituting another one. This is useful, e.g., if the device is shifted from a working position into a rest position or removed completely from the optical imaging system. For this purpose, the device is preferably of modular design, so that it can be integrated in a great many optical imaging systems, especially microscopes.

Figure 2:
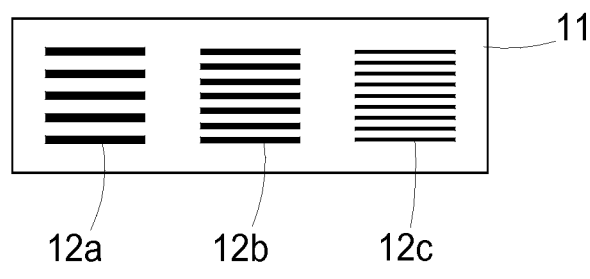
FIG. 2 shows a substrate with three different grating-like patterns.

The grating changer can be designed in various ways. One way is to design it so that it comprises a transparent substrate that can be shifted normal to the optical axis of the illuminating beam by motor action and on which several grating-like patterns differing from each other are applied. Such a substrate 11 is shown in FIG. 2. It is a simple plane-parallel glass plate, on which, in this case, binary line gratings 12 are applied, which differ from each other in line width and periodicity, i.e. line spacing. Instead of binary line gratings 12*a*, 12*b*, 12*c*, other gratings that essentially have the same effect can be used. Whereas the transmission behavior across the direction of the lines in the binary line grating 12*a*, 12*b*, 12*c* is of rectangular shape, line gratings in which die transmission across the direction of the lines varies continuously rather than in steps can be used as well, such as, e.g., sinusoidal gratings. A substrate may also contain different types of such gratings. Further grating-like patterns eligible for use are checkerboard patterns and two-dimensional transmission gratings, as well as phase gratings.

An example of a grating changer with which the transparent substrate 11 can be used is shown in FIG. 3*a* and FIG. 3*b*. The grating changer comprises a housing 13, which contains a motor with which a holder 14 accommodating the substrate 11 can be shifted in a plane, which here corresponds to the sheet plane. For this purpose, the holder 14 is supported in a guideway 15 in which it can be shifted. The view is as seen from the direction of the object; the glass plate 10 is arranged in front of the substrate 11. In FIG. 3*a*, the substrate 12*c* is in the beam path. The substrates are large enough to cover the entire visible area. The grating changer is inserted, e.g., in a microscope, which features an objective changer with three objectives. The substrate 11 is selected to match the objectives, so that the grating patterns arranged on the substrate 11 are those that match the magnifications and/or numerical apertures best. If a user changes the objective by turning the revolving nosepiece, the electronic control system detects which objective is switched into the beam path and controls the motor of the grating changer to remove the present grating pattern 12*c* from the illuminating beam path and to put the grating pattern matching the new objective—in this case, grating pattern 12*a*—into den illuminating beam path. In addition or alternatively, the change can be initiated by a control program as described above. The result is shown in FIG. 3*b*.

Furthermore, the grating changer is provided with a sensor 16, which, in the respective positions of the grating changer in the instrument, signals to the electronic control system whether the grating changer is in a working position or in a rest position. In the latter case, the electronic control system ensures that the slider with the substrate 11 is completely retracted so that none of the grating-like patterns is in the illuminating beam path any more. This behavior, too, can be controlled by the user. Also, the substrate 11 is accessible on the illumination side of the grating changer or from the top or bottom for being changed if necessary. For this purpose it is further possible to move the shiftable holder 14 into a maintenance position, which corresponds to the fully retracted position, and to remove the device from the instrument without the shiftable holder being completely pulled in so as to be out of sight.

In the embodiment shown in FIG. 3*a* and FIG. 3*b*, removing one grating-like pattern from, and putting the next one into den illuminating beam path is performed in a single step, i.e. by shifting the holder 14 with the substrate 11 on which the grating-like patterns are applied. In a similar embodiment, the grating-like patterns can be arranged on a wheel-shaped substrate whose axis of rotation is parallel to the optical axis. Such a substrate may possibly accommodate more than three substrates, which facilitates operation in case any of the objectives has to be removed from the objective changer and replaced with another. This solution takes some more space, but is equivalent in effect to the embodiment shown in FIG. 3*a* and FIG. 3*b*.

Rather than accommodating three grating-like patterns on one substrate 11, it is also possible to provide a separate substrate for each grating-like pattern. These can be put into the illuminating beam path in turn by motor action, e.g., by pushing or turning. For example, three substrates may be arranged on three sliders in a housing, and in the event of a change of objectives, the slider with the line grating in the illuminating beam path is removed therefrom, whereupon the line grating matching the new objective is pushed into the illuminating beam path. If the (at best) three objectives accommodated in the objective changer are known to the electronic control system, it can determine from the sense of rotation which objective is being brought into the beam path. Moreover, it is also possible to assign each of the positions of the objective changer to a particular objective, e.g., via identification codes which the objective automatically signals to the electronic control system or the control software when it is fitted to the objective changer; alternatively, the positions can be entered manually by the user.

Via the electronic control system and/or the control program, the grating changer is coupled to the objective changer; the electronic control system or the control program, respectively, is designed to select the grating-like pattern to be put into the beam path as a function of the magnification and/or numerical aperture of the objective selected.

If substrates are used that contain only one grating-like pattern each, these can be put into the illuminating beam not only by pushing but also by rotation. In this case, rotation is about an axis parallel to the optical axis, similar to the embodiment featuring a wheel, save that the embodiment with single-pattern substrates takes not quite as much space. Combinations of push-in and turn-in of substrates are also feasible, if required or permitted by the instrument's architecture. It is further possible to use substrates containing several grating-like patterns and still keep a number of substrates available in the device at a time. Instead of a system of substrates and sliders/wheels it is also possible to use a grating changer with a unit for spatial light modulation, which can be triggered to generate different grating-like patterns. Here, many mechanical and, thus, relatively wear-prone parts can be left out, whereas a relatively complex control system is required for the unit for light modulation, the use of which will cause light losses at that.

The device for increasing depth discrimination described before will make it considerably easier for the user of an optical imaging systems, especially a microscope with several objectives in a revolving nosepiece, to adapt the structured illumination used for increasing depth discrimination, because, compared to solutions known in prior art, it substantially reduces the necessity of manual intervention for the said adaptation.

What is claimed is:

1. A device for increasing the depth discrimination of optical imaging systems, comprising:
   means for structuring illumination light in an illumination beam of the optical imaging system, including a grating-like pattern in a conjugated object plane of the optical imaging system;
   means for varying the position of the grating-like pattern along an optical axis of the illumination beam;
   means for varying the lateral position of an image of the grating-like pattern on a specimen in an object plane;
   an electronic control system; and
   a grating changer connected with the electronic control system, wherein the grating changer is arranged to automatically change the grating-like pattern to a different grating-like pattern or remove the grating-like pattern from a path of the illumination beam.

2. The device of claim 1, wherein the grating changer comprises a transparent substrate which can be moved relative to the optical axis of the illuminating beam by motor action and on which a plurality of grating-like patterns differing from each other are provided.

3. The device of claim 1, wherein the grating changer comprises several substrates, each with one grating-like pattern, which can be placed in the illuminating beam path by motor action.

4. The device of claim 1, wherein the grating changer comprises a spatial light modulation unit for generating varied grating-like patterns.

5. The device of claim 1, wherein the grating changer is coupled with an objective changer of the optical imaging system via the electronic control system and the electronic control system selects the grating-like pattern to be brought into the illumination beam path as a function of the magnification and/or numerical aperture of the objective selected.

6. An optical imaging system including a device for increasing the depth discrimination, the device comprising:
   means for structuring illumination light in an illumination beam, including a grating-like pattern in a conjugated object plane;
   means for varying the position of the grating-like pattern along an optical axis of the illumination beam;
   means for varying the lateral position of an image of the grating-like pattern on a specimen in an object plane;
   an electronic control system; and
   a grating changer connected with the electronic control system, wherein the grating changer is arranged to automatically change the grating-like pattern to a different grating-like pattern or remove the grating-like pattern from the illumination beam path.

7. The optical imaging system of claim 6, wherein the optical imaging system is a microscope.

8. The optical imaging system of claim 6, wherein the grating changer comprises a transparent substrate which can be moved relative to the optical axis of the illuminating beam by motor action and on which a plurality of grating-like patterns differing from each other are provided.

9. The optical imaging system of claim 6, wherein the grating changer comprises several substrates, each with one grating-like pattern, which can be placed in the illuminating beam path by motor action.

10. The optical imaging system of claim 6, wherein the grating changer comprises a spatial light modulation unit for generating varied grating-like patterns.

11. The optical imaging system of claim 6, wherein the grating changer is coupled with an objective changer of the optical imaging system via the electronic control system, and the electronic control system selects the grating-like pattern to be brought into the beam path as a function of the magnification and/or numerical aperture of the objective selected.

12. The optical imaging system of claim 6, wherein, when a rest position is set on the device or when the device is removed from the optical imaging system, the grating changer removes the grating-like pattern from the illumination beam.

13. The optical imaging system of claim 6, wherein when a working position is set on the device or when the device is inserted into the optical imaging system, the grating changer inserts the grating-like pattern into the illumination beam.

* * * * *